Figure 1:
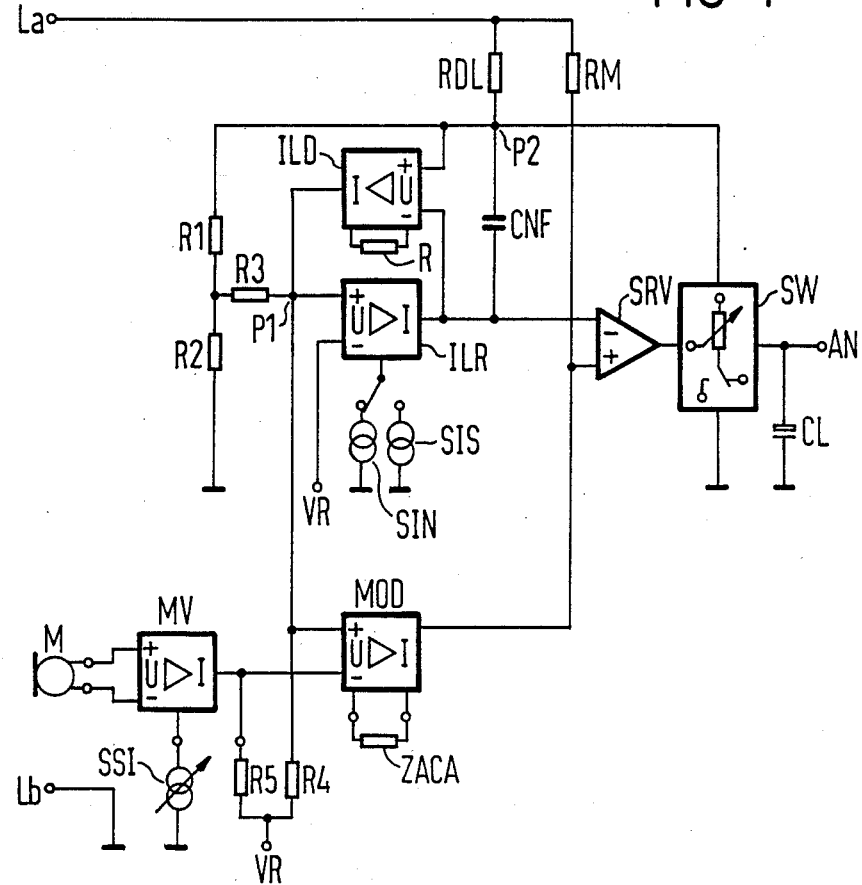

United States Patent [19]

Doll et al.

[11] Patent Number: 4,847,898

[45] Date of Patent: Jul. 11, 1989

[54] SPEECH CIRCUIT CONFIGURATION

[75] Inventors: Armin Doll; Emil Navratil, both of München, Fed. Rep. of Germany

[73] Assignee: Siemens Aktiengesellschaft, Berlin and Munich, Fed. Rep. of Germany

[21] Appl. No.: 103,407

[22] Filed: Sep. 30, 1987

[30] Foreign Application Priority Data

Sep. 30, 1986 [DE] Fed. Rep. of Germany ....... 3633234

[51] Int. Cl.$^4$ ...................... H04M 1/00; H04M 19/00
[52] U.S. Cl. .................................. 379/395; 379/387; 379/413
[58] Field of Search ............... 379/395, 394, 398, 387, 379/399, 413, 388, 391, 392

[56] References Cited

U.S. PATENT DOCUMENTS 4,626,626 12/1986 Coulmance ......................... 379/394
4,639,551 1/1987 Kaire ................... 327/231

FOREIGN PATENT DOCUMENTS 0146183 12/1984 European Pat. Off. .
0154366 9/1985 European Pat. Off. .
3337393 4/1985 Fed. Rep. of Germany .
3505634 8/1986 Fed. Rep. of Germany .

OTHER PUBLICATIONS

Philips Specification TEA 1060, TEA 1061, Jul. 1983 pp. 394-406.

Primary Examiner—Jin F. Ng
Assistant Examiner—Randall S. Vaas
Attorney, Agent, or Firm—Herbert L. Lerner; Laurence A. Greenberg

[57] ABSTRACT

An electronic speech circuit configuration includes first and second line terminals to be connected to a telephone line. An AC circuit portion includes a modulator circuit for generating a line transmission current. A DC circuit portion supplies energy and generates a DC current/voltage characteristic curve. The DC circuit portion includes a reference potential source and a decoupling capacitor. A current sensing resistor is provided. A high-speed control amplifier has a control circuit and controls current through the current sensing resistor. A buffer capacitor is provided. Output terminals are connected to the buffer capacitor for the connection of external components. The DC circuit portion also includes a current toggle circuit connected upstream of the buffer capacitor. The current for feeding the buffer capacitor flows through the current sensing resistor connected to the first line terminal. The DC circuit portion and the AC circuit portion are connected in the control circuit of the high-speed control amplifier.

25 Claims, 1 Drawing Sheet

SPEECH CIRCUIT CONFIGURATION

The invention relates to an electronic speech circuit configuration to be connected to a telephone line through first and second line terminals, including an AC circuit portion having a modulator circuit for generating a line transmission current, a DC circuit portion for energy supply and for generating a DC current/voltage characteristic curve having a reference potential source and a decoupling capacitor, a high-speed control amplifier for controlling the current through a current sensing resistor, and a buffer capacitor connected to output terminals for the connection of external components, the buffer capacitor being fed through a resistor connected to the first line terminal.

A speech circuit configuration of this type is known from Philips Specification TEA 1060, TEA 1061: "Versatile Telephone Transmission Circuits with Dialer Interface", July, 1983.

In FIGS. 1 and 3 of the aforementioned publication, a generic speech circuit configuration is disclosed, which includes an integrated circuit. The integrated circuit and external components, such as dialing circuits or monitoring circuits, are supplied through the telephone line, and the integrated circuit generates its own voltage supply which, however, is dependent on the external load. This intrinsic supply voltage is also used for supplying the external components. A buffer capacitor connected to the output terminals for connecting the external components, is used for decoupling.

The voltage drop through a decoupling capacitor with respect to a resistor R9 and a current $I_{CC}$ increased by 0.5 mA, which the integrated circuit itself consumes, determine the line current that flows through a transistor connected to the output side of the high-speed control amplifier. According to FIG. 3 of the aforementioned publication, a resistor R1 of 600 ohms, which corresponds to the AC internal resistance of the speech circuit, feeds the buffer capacitor C1, together with it forms a low-pass filter and is located between a line terminal LN and a terminal $V_{CC}$ for the internal and external voltage supply.

In the aforementioned circuit layout, the DC portion of the circuit generates a supply voltage for the integrated circuit and the externally connected buffer capacitor generates a DC current/voltage characteristic curve. The AC portion of the circuit, which has a modulator circuit for generating a line transmission current, is coupled to the DC circuit portion, but the formation of the AC impedance is not. The DC portion of the circuit and the modulator circuit control the high-speed control amplifier and therefore the line current.

The current sensing resistor R9, which substantially co-determines the line current, represents a relatively small differential DC resistor, according to FIG. 3 of the above-mentioned specification. A resistor R1, which is equal to the AC internal resistance of the speech circuit configuration, is not located in the control circuit of the configuration; that is, it is not located in the control circuit of the DC portion of the circuit. A voltage drop is generated at this resistor that results in a poor voltage supply to the external components.

Nor does an (electronic) choke connected parallel to the resistor R1 for increasing the current for the external load provide freedom from feedback to the speech circuit itself. Thus in the prior art circuit, a regulated DC current/voltage characteristic curve and a differential resistance higher than the resistor R9 are neither present nor possible.

It is accordingly an object of the invention to provide a speech circuit configuration, which overcomes the hereinafore-mentioned disadvantages of the heretofore-known devices of this general type, which has a defined differential resistance and a fixed DC current/voltage characteristic curve, which furnishes a feedback-free buffered supply voltage for external components through output terminals and which enables optimal exploitation of the available line current, so that even at low line currents, that is DC and AC currents, a maximum possible current is still available for supplying the external load.

With the foregoing and other objects in view there is provided, in accordance with the invention, an electronic speech circuit configuration, comprising first and second line terminals to be connected to a telephone line; an AC circuit portion including a modulator circuit for generating a line transmission current; a DC circuit portion for supplying energy and for generating a DC current/voltage characteristic curve, the DC circuit portion including a reference potential source and a decoupling capacitor; a current sensing resistor; a high-speed control amplifier having a control circuit and controlling current through the current sensing resistor; a buffer capacitor; output terminals connected to the buffer capacitor for the connection of external components; the DC circuit portion also including a current toggle circuit connected upstream of the buffer capacitor; the current for feeding the buffer capacitor flowing through the current sensing resistor connected to the first line terminal; the DC circuit portion and the AC circuit portion being connected in the control circuit of the high-speed control amplifier.

An advantage of the circuit configuration according to the invention is that the DC portion of the circuit generates a fixed current/voltage characteristic curve having a defined differential resistance and together with the AC portion of the circuit, the high-speed control amplifier and the current toggle circuit in the output circuit thereof, forms a current source in which the predetermined desired current flows into the buffer capacitor to the maximum extent possible and is independent of the external load. The AC current, which flows as a consequence of the internal resistance of the speech circuit configuration, and the AC transmission modulation current or the microphone signal and the line signal are also included in the control circuit of the current source and determine the instantaneous desired current. Thus a high degree of exploitation of the current is attained in terms of the speech circuit configuration and the supply to the external load.

In accordance with another feature of the invention, the current sensing resistor has terminals, the high-speed control amplifier has first and second inputs, and there is provided a modulation resistor, the modulation resistor and the decoupling capacitor being connected between the inputs of the high-speed control amplifier and the terminals of the current sensing resistor.

In accordance with a further feature of the invention, there is provided a feed node, the current sensing resistor being connected between one of the line terminals and the feed node.

In accordance with an added feature of the invention, the decoupling capacitor is connected between the feed node and the first input of the high-speed control amplifier, and the modulation resistor is connected between the first line terminal and the second input of the high-speed control amplifier.

In accordance with an additional feature of the invention, the modulation resistor and the decoupling capacitor form a series circuit, the first input of the high-speed control amplifier is connected to the feed node, and the second input of the high-speed control amplifier is connected to one of the line terminals through the series circuit.

In accordance with yet another feature of the invention, the decoupling capacitor is connected to the first input of the high-speed control amplifier at a given point, and there is provided a DC line current controller having an output side connected to the given point, and a DC line current detector detecting voltage at the decoupling capacitor and controlling the DC line current controller.

In accordance with yet a further feature of the invention, the DC line current detector is a transconductance amplifier having a fixedly set slope.

In accordance with yet an added feature of the invention, the DC line current regulator is a transconductance amplifier having a variable slope.

In accordance with yet an additional feature of the invention, the DC line current regulator is a transconductance amplifier having a reversibly variable slope.

In accordance with still another feature of the invention, the DC line current regulator is a transconductance DC line current regulator, and there are provided means for switching over the transconductance DC line current regulator from a high slope during a switching on phase of the circuit configuration to a normal slope during other operating phases.

In accordance with still a further feature of the invention, there is provided an AC node, an ohmic voltage divider formed of the current sensing resistor and further resistors, the ohmic voltage divider having a divider point and being connected between the line terminals, the DC line current controller having one input connected to the reference potential source and another input connected the AC node, the DC line current detector having an output connected to the AC node, a first ohmic resistor connected between the AC node and the reference potential source, and a second ohmic resistor connected between the AC node and the divider point of the ohmic voltage divider.

In accordance with still an added feature of the invention, the modulator circuit includes a modulator.

In accordance with still an additional feature of the invention, the modulator is a transconductance amplifier having a fixedly set slope.

In accordance with again another feature of the invention, the modulator/transconductance amplifier has a slope proportional to the reciprocal AC impedance of the speech circuit configuration.

In accordance with again a further feature of the invention, the modulator has one input connected to the AC node, another input and an output, and there are provided connection terminals for a microphone, a microphone preamplifier connected between the other input of the modulator and the connection terminals, and a modulation resistor connected between the output of the modulator and the first line terminal.

In accordance with again an added feature of the invention, there are provided means for controlling the gain of the microphone preamplifier.

In accordance with again an additional feature of the invention, the microphone preamplifier is a transconductance amplifier, and there are provided means for variable controlling the slope of the microphone preamplifier.

In accordance with another feature of the invention, the microphone preamplifier has an output connected to the other input of the modulator, and including an output resistor connected between the output of the microphone preamplifier and the reference potential source.

In accordance with a further feature of the invention, the modulation resistor is connected to the output of the modulator at a given point, and the second input of the high-speed control amplifier is connected to the given point.

In accordance with an added feature of the invention, the current sensing resistor corresponds to the resistor through which the current flows for feeding the buffer capacitor.

In accordance with an additional feature of the invention, the buffer capacitor and the output terminals connected thereto are connected to the remainder of the circuit configuration in a feedback-free manner.

In accordance with yet another feature of the invention, the current toggle circuit is connected to the feed node and includes an electronic switch having an output side and means for switching over the output side between a terminal of the buffer capacitor and the second line terminal.

In accordance with yet a further feature of the invention, the current toggle circuit includes two switching transistors of one conduction type each having one output terminal connected to the feed node and another output terminal, the other output terminal of one of the switching transistors being connected to a terminal of the buffer capacitor, and the other output terminal of the other of the switching transistors being connected to the second line terminal.

In accordance with yet an added feature of the invention, the switching transistors have control terminals, the high-speed control amplifier has an output, and there is provided another ohmic voltage divider connected between the feed node and the output of the high-speed control amplifier and having a divider point and a base, first and second control transistors of the other conduction type controlling the switching transistors and having output circuits connected in series with a connecting point therebetween and output terminals, one of the output terminals of the first control resistor being connected to the feed node, one of the output terminals of the second control transistor being connected to the control terminal of one of the switching transistors, and the connecting point of the output circuits of the control transistors being connected to the control terminal of the other of the switching transistors, the first control transistor being connected to and controlled from the divider point of the other ohmic voltage divider, and the second control transistor being connected to and controlled from the output of the high-speed control amplifier and from the base of the other ohmic voltage divider.

In accordance with yet an additional feature of the invention, the control transistors have control inputs, the second control transistor controls the other switching transistor connected to the second line terminal, and the other ohmic voltage divider has a first resistor connected between the control inputs of the control transistors and a second resistor connected between the control input of the first control transistor and the feed node, the first resistor having a resistance being smaller than the resistance of the second resistor by substantially one order of magnitude.

In accordance with a concomitant feature of the invention, the second line terminal is connected to a reference terminal.

Other features which are considered as characteristic for the invention are set forth in the appended claims.

Although the invention is illustrated and described herein as embodied in speech circuit configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
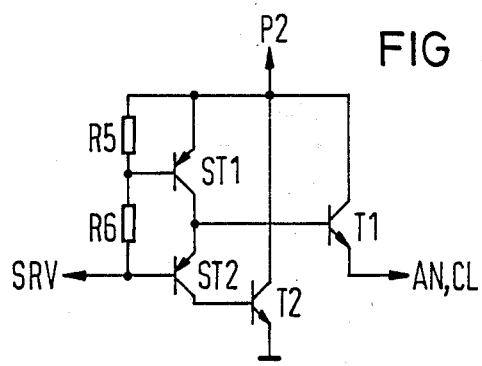

FIG. 1 is a schematic and block circuit diagram of an electronic speech circuit configuration according to the invention; and FIG. 2 is a circuit diagram of a concrete embodiment of the current toggle circuit of FIG. 1.

Referring now to the figures of the drawings in detail and first, particularly, to FIG. 1 thereof, there is seen an electronic speech circuit configuration according to the invention connected to a telephone line through two line terminals La and Lb. The telephone line can be represented by non-illustrated equivalent or substitute elements of a voltage feed source at the central exchange having an internal resistance and a line resistance. The second line terminal Lb is connected to reference or standard potential, such as ground. The first line terminal La is connected through a current sensing resistor RDL for the line current to a feed node P2. The feed node P2 is connected through an ohmic voltage divider formed of resistors R1 and R2 to the reference or standard potential. On the other hand, a current toggle circuit SW is fed from the node P2. Finally, the node P2 is connected through a decoupling capacitor CNF to the inverting input of a high-speed control amplifier SRV as well as to the output of a DC line current controller ILR. The input side of a DC line current detector ILD picks up the voltage across the decoupling capacitor CNF. Therefore, one input of the DC line current detector ILD is also connected to the node P2. The output side of the line current detector ILD controls an AC node P1.

The node P1 is connected first through a resistor R3 to the point connecting the two resistors R1 and R2, second to an input of the line current controller ILR, third to an input of a modulator MOD, and fourth through a resistor R4 to a terminal VR at which another reference potential is located. The second input of the DC line current controller ILR is connected directly to the terminal having the reference potential.

The modulator MOD is part of the AC portion of the circuit for generating a line transmission current. While one input of the modulator MOD is connected to the AC node P1, the other input is connected through a resistor R5 to the terminal VR having the reference potential as well as to the output of a microphone preamplifier MV. A microphone M is connected externally to the input terminals of the microphone preamplifier MV. The microphone preamplifier MV preferably has controllable gain. One output of the modulator MOD is connected to the non-inverting input of the high-speed control amplifier SRV as well as through a modulation resistor RM to the first line terminal La.

The output of the high-speed control amplifier SRV controls one input of the current toggle circuit SW, which is shown in simplified form in FIG. 1 as a controlled resistor having a switch. One output of the current toggle circuit SW is connected to the reference or standard potential and the other output is connected to a terminal AN for connection of an external load. A buffer capacitor CL is connected between the terminal AN and the reference or standard potential.

In FIG. 1, the DC line current detector ILD, the DC line current controller ILR, the modulator MOD and the microphone preamplifier MV are each in the form of a transconductance amplifier or a voltage/current converter having a fixedly set or variable slope.

The DC line current detector ILD thus has a fixedly set slope, corresponding approximately to the reciprocal of a symbolically illustrated resistance R. The modulator MOD has a fixedly set slope corresponding approximately to the reciprocal of an externally connectable, symbolically illustrated resistance ZACA. In the illustrated embodiment, the resistance ZACA corresponds to the AC impedance of the speech circuit configuration.

The slope of the microphone preamplifier MV is variable and is controllable with the aid of a controllable current source SSI. The current source SSI is located between an external or internal terminal and the reference or standard potential. The current source SSI is controllable, for instance, by a signal that depends on the current or voltage values as well as the threshold values for undermodulation or overmodulation of the circuit configuration.

The line current controller or regulator ILR can be switched over through a switch connected to one end of each of two current sources SIN and SIS that are connected at the other ends thereof to the reference or standard potential. These optionally controlled current sources symbolize different variable slopes, so that depending on the switch position, either a normal slope for normal operation or a steep slope especially for transient events, becomes possible. Thus the time constant for the DC-AC separator can be controlled with the decoupling capacitor CNF through the slope of the controller ILR.

The resistor R5 located between the output of the microphone preamplifier MV and the terminal VR having the reference potential should preferably be connected externally through a terminal in order to substantially influence the gain of the microphone amplifier MV and the frequency response. Thus the microphone preamplifier MV is adapted to the input of the modulator MOD connected downstream thereof.

The circuit configuration according to the invention shown in FIG. 1 functions as follows: First, it is assumed that the cradle or the button on the cradle of the telephone set having the speech circuit is depressed, that is the handset is in the cradle and the flow of current is interrupted. When the handset is lifted and the cradle is released, the current circuit is closed, but initially no current should flow.

The circuit configuration puts two control circuits into operation: first, a (high-speed) control of the line current as a function of the voltage at the decoupling capacitor CNF and second, the controlled (low-speed) charging or discharging of the decoupling capacitor CNF with the aid of the ohmic voltage divider formed of the resistors R1–R3 as well as the DC line current detector ILD and the DC line current controller ILR.

When the circuit is switched on, the node P1 receives a positive potential through the resistors R1–R3. The DC line current detector ILD detects no voltage across the decoupling capacitor CNF and does not shift the potential of the node P1, so that the DC line current controller ILR intervenes with a comparatively high current to charge the decoupling capacitor CNF. The resultant voltage at the decoupling capacitor CNF through the high-speed control amplifier SRV produces a DC line current. On the output side, a current corresponding to the voltage difference on the input side then flow into the DC line current detector ILD, thereby reducing the potential at the node P1. The then-reduced voltage difference at the input of the DC line current controller ILR leads to a lesser output current of the line current controller.

The charging process for the decoupling capacitor CNF is ended whenever the actual DC line current corresponds to the set current of the current/voltage characteristic curve. This setting is accomplished by way of the dimensioning of the ohmic voltage divider formed of the resistors R1–R3, the slope of the DC line current ILD, and the resistance of the current sensing resistor RDL.

Thus a variation in the DC voltage always produces charging or discharging of the decoupling capacitor CNF through the line current detector and the line current controller, and this process does not end until the potential at the node P1 is again at reference potential. This is the case whenever the DC line current corresponds to the DC current of the line current detector. The capacitance of the decoupling capacitor CNF is selected to be high enough so that the capacitor decouples the AC portion of the circuit from the DC portion of the circuit, that is it serves as a good approximation of a short circuit for AC currents.

The mode of the DC control circuit can be optimally set between normal operation and operation with abrupt DC changes, with the aid of the switched current sources SIN and SIS, which determine the slope of the DC line current controller ILR. Despite the relatively high differential resistance, which is dictated by the DC voltage/current characteristic curve, the current sensing resistor RDL can be selected to be smaller than comparable circuit configurations in the prior art by approximately a factor of 10, so that at the same time only a small voltage drop takes place across the resistor RDL.

When an AC line voltage is received, the DC control does not intervene and an AC voltage proportional to the AC line voltage is present at the node P1 or at the "+" input of the modulator MOD, which is converted into a modulated output current through the modulator MOD having the slope of the reciprocal AC impedance ZACA of the circuit configuration. The modulated output current has a feedback effect on the telephone line through the modulation resistor RM or the high-speed control amplifier SRV. The AC portion of the circuit behaves correspondingly, but inversely, at the inputs of the modulator MOD whenever a line transmission signal is generated through the microphone M and the microphone preamplifier MV. The modulated output current of the modulator MOD, which naturally may be a modulated DC current or a modulated transmission bias current, is sent to the telephone line through the modulation resistor RM, or is fed back through the high-speed control amplifier SRV and the current sensing resistor RDL to the other modulator input or to the other input of the high-speed control amplifier SRV. In both cases, that is upon reception of a signal and upon transmission of a signal, the internal resistance of the speech circuit configuration is incorporated into the control circuit.

The high-speed control amplifier SRV is linked through two inputs to both the DC and AC portions of the circuit and always furnishes an output signal whenever voltage difference exists between the two inputs thereof. The output of the high-speed control amplifier SRV controls the current toggle SW in such a way that the predetermined desired current flows into the buffer capacitor CL as much as possible, or if that should not be possible because the line voltage is too low, then it is carried directly to the reference or standard potential.

The predetermined desired current is independent of the load that is connected between the terminal AN and the reference or standard potential. This guarantees a fixed DC voltage/current characteristic curve.

The incorporation of the high-speed control amplifier SRV which is controlled by the DC and AC current through the current toggle circuit SW that influences the feed node P2, into the speech circuit according to the invention which is in the form of a regulated current source, enables optimal exploitation of the line current available, so that with low line currents the greatest possible proportion is available for supply to the external load, and to this end both the DC and AC currents are used.

An essential factor is always that the inputs of the high-speed control amplifier SRV are connected to the terminals of the current sensing resistor RDL through the modulation resistor RM and the decoupling capacitor CNF. According to the invention, the current sensing resistor RDL can also be connected to the line terminal Lb, or in other words it can be located in the ground line route. The line terminal Lb is then connected through the resistor RDL to the reference or standard potential or ground. One input of the high-speed control amplifier SRV is located at reference or standard potential or ground, for example at a feed node, and the other input is connected through the series circuit of the modulation resistor RM and the decoupling capacitor CNF to the line terminal Lb.

In the embodiment illustrated in FIG. 2, the current toggle circuit SW includes two switching transistor T1 and T2 of the n-p-n type, which are each connected with one output terminal thereof, namely the collector, to the feed node P2. The emitter terminal of the switching transistor T1 is connected to a terminal of the buffer capacitor CL as well as to the output terminal AN and the emitter terminal of the switching transistor T2 is connected to the reference or standard potential.

The input sides of the switching transistors T1 and T2 are controlled by two control transistors ST1 and ST2, which have the output circuits thereof connected in series. The emitter of the transistor ST1 is connected to the feed or control node P2 and the collector of the transistor ST2 is connected to the base of the switching transistor T2. The connecting point of the output circuits of the two controls transistors ST1 and ST2 leads to the base of the switching transistor T1. A voltage divider formed by ohmic resistors R5 and R6 is connected between the feed node P2 and the base of the control transistor ST2. The divider point of the voltage divider triggers the base of the control transistor ST1.

The base of the control transistor ST2 and the associated terminal of the resistor R6 are connected to the output of the high-speed control amplifier SRV. In terms of resistance, the resistor R6 is approximately one order of magnitude smaller than the resistor R5, for example 1 kOhm to 10 kOhm.

The current toggle circuit SW of FIG. 2 functions as follows: With a sufficiently great voltage difference between the load capacitor CL or the output terminal AN and the first line terminal La, the current flows through the transistor T1 triggered by the control transistor ST1 into the buffer capacitor CL. On the other hand, if the line voltages are so low relative to the potential at the terminal AN that the control transistor ST1 enters saturation, then the control transistor ST2 and thus the switching transistor T2 become conductive, and the current flows to ground.

Because of the decoupling of the buffer capacitor CL or the output terminal AN from the speech circuit configuration with the aid of the transistor T1, the charge is largely maintained in the buffer capacitor, aside from typical physical losses, when the instantaneous line voltage is low or when the speech circuit configuration is shut off. The result at the terminal AN is accordingly a potential that is lower than the potential of the first line terminal La by the voltage drop at the current sensing resistor RDL, the voltage drop at the control transistor ST1 and the threshold voltage of the switching transistor T1.

We claim:

1. Electronic speech circuit, comprising first and second line terminals to be connected to a telephone line; an AC circuit portion including a modulator circuit for generating a line transmission current; a DC circuit portion for supplying energy and for generating a DC current/voltage characteristic curve, said DC circuit portion including a reference potential source and a decoupling capacitor; a current sensing resistor; a control amplifier having a control circuit and controlling current through said current sensing resistor; a buffer capacitor; output terminals connected to said buffer capacitor for the connection of external components; said DC circuit portion also including a current toggle circuit having an output connected to said buffer capacitor; the current for feeding said buffer capacitor flowing through said current sensing resistor; said DC circuit portion and said AC circuit portion being connected in said control circuit of said control amplifier, wherein said current sensing resistor has terminals, said control amplifier has first and second inputs, and including a modulation resistor, said modulation resistor and said decoupling capacitor being connected between said inputs of said control amplifier and said terminals of said current sensing resistor.

2. Circuit according to claim 1, including a feed node, said current sensing resistor being connected between one of said line terminals and said feed node.

3. Circuit according to claim 2, wherein said decoupling capacitor is connected between said feed node and said first input of said control amplifier, and said modulation resistor is connected between said first line terminal and said second input of said control amplifier.

4. Circuit according to claim 2, wherein said modulation resistor and said decoupling capacitor form a series circuit, said first input of said control amplifier is connected to said feed node, and said second input of said control amplifier is connected to one of said line terminals through said series circuit.

5. Circuit according to claim 3, wherein said decoupling capacitor is connected to said first input of said control amplifier at a given point, and including a DC line current controller having an output side connected to said given point, and a DC line current detector detecting voltage at said decoupling capacitor and controlling said DC line current controller.

6. Circuit according to claim 5, wherein said DC line current detector is a transconductance amplifier having a fixedly set slope.

7. Circuit according to claim 5, wherein said DC line current regulator is a transconductance amplifier having a variable slope.

8. Circuit according to claim 5, wherein said DC line current controller is a transconductance amplifier having a switchably variable slope.

9. Circuit according to claim 5, wherein said DC line current controller is a transconductance DC line current controller, and including means for switching over said transconductance DC line current controller from a high slope during switching-on of the circuit to a normal slope during operation.

10. Circuit according to claim 5, including an AC node, an ohmic voltage divider formed of said current sensing resistor and further resistors, said ohmic voltage divider having a divider point and being connected between said line terminals, said DC line current controller having one input connected to said reference potential source and another input connected to said AC node, said DC line current detector having an output connected to said AC node, a first ohmic resistor connected between said AC node and said reference potential source, and a second ohmic resistor connected between said AC node and said divider point of said ohmic voltage divider.

11. Circuit according to claim 10, wherein said modulator circuit includes a modulator.

12. Circuit according to claim 11, wherein said modulator is a transconductance amplifier having a fixedly set slope.

13. Circuit according to claim 12, wherein said modulator/transconductance amplifier has a slope proportional to the reciprocal AC impedance of the speech circuit configuration.

14. Circuit according to claim 11, wherein said modulator has one input connected to said AC node, another input and an output, a microphone preamplifier connected between said other input of said modulator and said microphone via connection terminals for the microphone, and a modulation resistor connected between said output of said modulator and said first line terminal.

15. Circuit according to claim 14, including means for controlling the gain of said microphone preamplifier.

16. Circuit according to claim 15, wherein said microphone preamplifier is a transconductance amplifier, and including means for variable controlling the slope of said microphone preamplifier.

17. Circuit according to claim 14, wherein said microphone preamplifier has an output connected to said other input of said modulator, and including an output resistor connected between said output of said microphone preamplifier and said reference potential source.

18. Circuit according to claim 3, wherein said modulation resistor is connected to said output of the modulator at a given point, and said second input of said high-speed control amplifier is connected to said given point.

19. Circuit according to claim 1, wherein said current sensing resistor provides current feed for said buffer capacitor.

20. Circuit according to claim 1, wherein said buffer capacitor serves to receive current flow from said feed node through a switching transistor.

21. Circuit according to claim 2, wherein said current toggle circuit is connected to said feed node and includes an electronic switch having an output side and means for switching over said output side between a terminal of said buffer capacitor and said second line terminal.

22. Circuit according to claim 10, wherein said current toggle circuit includes two switching transistors of one conduction type each having one output terminal connected to said feed node and an other output terminal, said other output terminal of one of said switching transistors being connected to a terminal of said buffer capacitor, and said other output terminal of the other one of said switching transistors being connected to said second line terminal.

23. Circuit according to claim 22, wherein said switching transistors have respective control terminals, said control amplifier has an output, and including another ohmic voltage divider connected between said feed node and said output of said control amplifier and having a divider point and a base, first and second control transistors of the opposite conduction type controlling said switching transistors and having output circuits connected in series with a connecting point therebetween and having respective output terminals, one of said output terminals of said first control transistor being connected to said feed node, the output terminal of said second control transistor being connected to said control terminal of one of said switching transistors, and said connecting point of said output circuits of said control transistors being connected to said control terminal of the other one of said switching transistors, said first control transistor being connected to and controlled from said divider point of said other ohmic voltage divider, and said second control transistor being connected to and controlled from said output of said control amplifier.

24. Circuit according to claim 23, wherein said control transistors have control inputs, said second control transistor controls said other switching transistor connected to said second line terminal, and said other ohmic voltage divider has a first resistor connected between said control inputs of said control transistors and a second resistor connected between said control input of said first control transistor and said feed node, said first resistor having a resistance being smaller than the resistance of said second resistor by substantially one order of magnitude.

25. Circuit according to claim 1, wherein said second line terminal is connected to a reference terminal.

* * * * *